G. L. TARBOX.
FLEXIBLE COUPLING.
APPLICATION FILED JAN. 8, 1921.

1,425,616.

Patented Aug. 15, 1922.

2 SHEETS—SHEET 1.

Inventor
Gurdon L. Tarbox
By his Attorneys
Sheffield & Betts

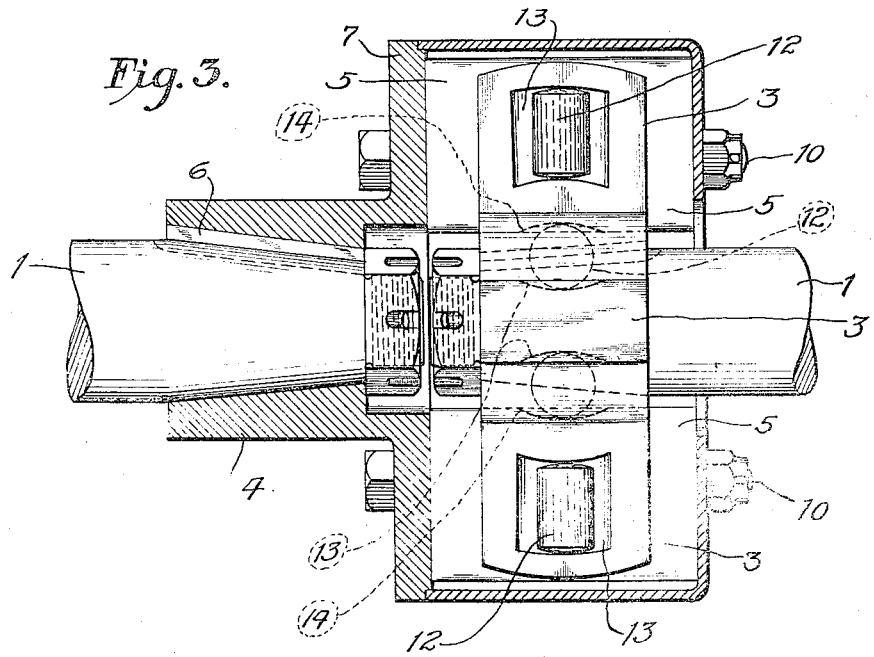
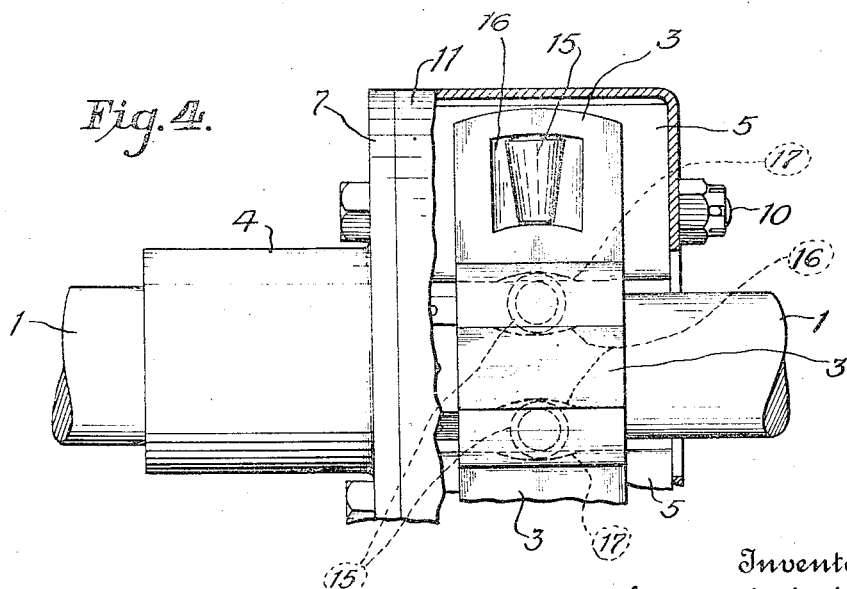

UNITED STATES PATENT OFFICE.

GURDON L. TARBOX, OF PLAINFIELD, NEW JERSEY, ASSIGNOR TO SPICER MFG. CORPORATION, OF SOUTH PLAINFIELD, NEW JERSEY, A CORPORATION OF VIRGINIA.

FLEXIBLE COUPLING.

1,425,616.

Specification of Letters Patent. Patented Aug. 15, 1922.

Application filed January 3, 1921. Serial No. 435,919.

*To all whom it may concern:*

Be it known that I, GURDON L. TARBOX, a citizen of the United States, residing at Plainfield, in the county of Union, State of New Jersey, have invented certain new and useful Improvements in Flexible Couplings, of which the following is a disclosure.

My invention relates to flexible couplings, such as are employed to connect the rotatable power shafts of all kinds and particularly to couplings for connecting the power shafts of automobiles and has for its object the provision of a coupling which will prevent or minimize the transmission of noises and vibrations originating in one shaft or a part to the other. A further object is to provide a coupling which will yield in the direction of rotation which will be strong and durable and comparatively small in size.

Figure 1:
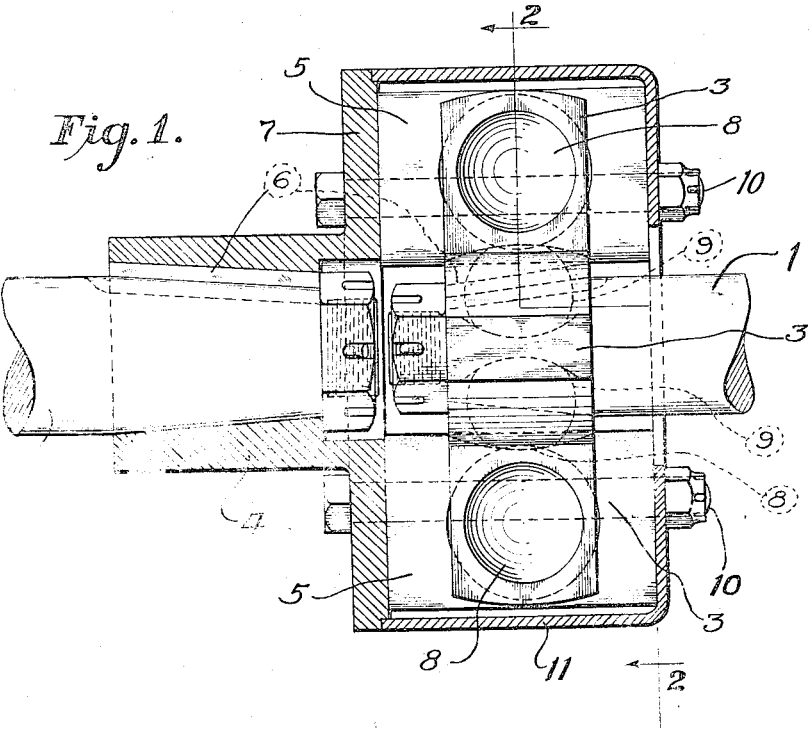
Figure 2:
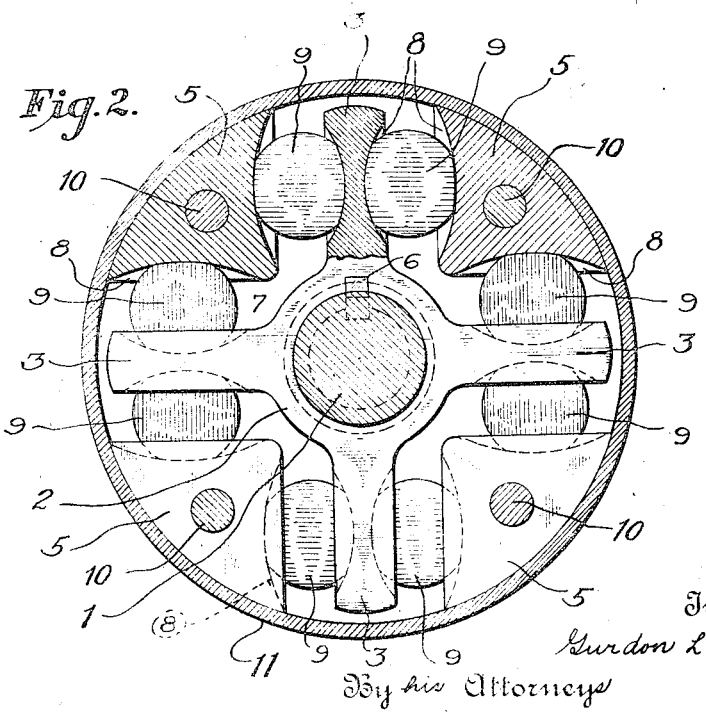

In the drawing accompanying and forming part of this specification, I have illustrated the preferred embodiment of my invention. Figure 1 is a longitudinal section of the coupling, and Figure 2 is a transverse section taken on the line 2—2 of Figure 1.

Figures 3 and 4 are longitudinal sectional views of two additional forms of coupling according to my invention.

Referring in detail to the structure illustrated, the reference numerals 1 designate the two shafts to be connected. Mounted on and keyed to one of these shafts, there is a hub 2 provided with radial arms or projections 3. Mounted on the other shaft, there is a hub 4 carrying projections 5 alternating with and disposed between the projections 3. It is essential in constructing my device that there be two sets of arms or projections and that one set shall be fixed to one shaft element and the other to the other shaft and that they shall alternate with each other but they may be constructed and arranged in many different ways. In the structure shown the projections 3 are formed integral with the hub 2 and the whole structure is keyed to the shaft by a key 6. The projections 5 are bolted to the flange 7 formed on the hub element 4 by bolts 10 which also function to hold the housing 11 in position. The two sets or projections have bowl shaped cavities 8 formed on their opposite faces and are separated by balls 9 of resilient rubber. These balls are preferably so inserted as to be normally under some compression. The bowl shaped cavities 8 are larger than the balls so as to permit the balls to roll freely in the cavities when the coupling is in use. This rolling feature coupled with the resiliency of the balls gives the coupling flexibility and resiliency with minimum friction.

It will be observed that in my improved coupling, the two halves of the device are connected entirely by means of the rubber balls. These balls not only permit the coupling to yield in the direction of rotation and prevent vibrations being transmitted from one element to the other, but they yield so as to allow the shafts to run out of line and so as to permit one shaft to move endwise to a certain extent with respect to the other thereby permitting the coupling to function as a slip joint. This renders the inclusion of a slip joint unnecessary in most arrangements.

In the apparatus illustrated in Figure 3, the resilient members 12 between the opposing sets 3 and 5 of projections have the form of cylinders, the cavities 13 and 14 in the projections 3 and 5, being also cylindrical in form, but of greater radius than that of the members 12.

In the apparatus illustrated in Figure 4, the resilient members 15 have the form of truncated cones, the cavities 16 and 17 in the projections 3 and 5 being correspondingly shaped, but of greater radius than the members 15.

The modifications illustrated in Figures 3 and 4 are designed for use more particularly in connection with installations where the angles to be taken care of is comparatively slight, but a high load carrying capacity is desired.

While I have described only the preferred embodiment of my invention, I am aware that modifications may be made by those skilled in the art and I desire protection for all such modifications as may come within the scope of my claims.

What I claim is:

1. A flexible shaft coupling comprising two hub members, a series of projections fixed to each hub member, the projections on one member alternating with and disposed between those on the other member, bowl shaped cavities formed on the adjacent faces of the projections and rubber balls disposed in said cavities and operating to flexibly connect the two parts of the coupling.

2. A flexible shaft coupling comprising two hub members, a series of projections fixed to each hub member, the projections on one member alternating with and disposed between those on the other member, bowl shaped cavities formed on the adjacent faces of the projections and rubber balls disposed in said cavities normally held under compression and operating to flexibly connect the two parts of the coupling.

3. A flexible shaft coupling comprising two hub members, a series of projections fixed to each hub member, the projections on one member alternating with and disposed between those on the other member, bowl shaped cavities formed on the adjacent faces of the projections, rubber balls disposed in said cavities and operating to flexibly connect the two parts of the coupling, the cavities being larger than the balls so as to permit the balls to roll under service conditions.

4. A flexible shaft coupling comprising two hub members, a series of projections fixed to each hub member, the projections on one member alternating with and disposed between those on the other member, bowl shaped cavities formed on the adjacent faces of the projections, rubber balls disposed in said cavities and operating to flexibly connect the two parts of the coupling, the cavities being larger than the balls so as to permit the balls to roll under service conditions and the two halves of the coupling being free to move towards and away from each other except as restrained by the balls.

5. A flexible shaft coupling comprising two hub members, a series of projections fixed to each hub member, the projections on one member alternating with and disposed between those on the other member, bowl shaped cavities formed on the adjacent faces of the projections, rubber balls disposed in said cavities normally held under compression and operating to flexibly connect the two parts of the coupling, the cavities having a greater radius of curvature than the balls so as to permit the balls to roll under service conditions and the two halves of the coupling being free to move except as restrained by the balls.

6. A flexible coupling comprising driving and driven members having bowl shaped cavities therein, and resilient balls intermediate said members and acting under compression, said balls being seated in said cavities and having a less diameter than that of said cavities.

7. A flexible coupling comprising driving and driven members, said members overlapping in both the radial and axial directions with respect to their axes of rotation, the overlapping portions of said members having cavities therein, the radial surfaces of said cavities being curved in the axial direction, and resilient rollers intermediate said members and acting under compression, said rollers being seated in said cavities and having a less diameter than that of said cavities.

GURDON L. TARBOX.